United States Patent
Kouda et al.

(10) Patent No.: US 11,535,065 B2
(45) Date of Patent: Dec. 27, 2022

(54) PNEUMATIC TIRE

(71) Applicant: The Yokohama Rubber Co., LTD., Tokyo (JP)

(72) Inventors: Hiraku Kouda, Hiratsuka (JP); Takayuki Shiraishi, Hiratsuka (JP); Tatsuro Shinzawa, Hiratsuka (JP); Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 219 days.

(21) Appl. No.: 16/482,545

(22) PCT Filed: Dec. 22, 2017

(86) PCT No.: PCT/JP2017/046133
§ 371 (c)(1),
(2) Date: Jul. 31, 2019

(87) PCT Pub. No.: WO2018/142802
PCT Pub. Date: Aug. 9, 2018

(65) Prior Publication Data
US 2020/0001655 A1 Jan. 2, 2020

(30) Foreign Application Priority Data

Feb. 2, 2017 (JP) .............................. JP2017-017536

(51) Int. Cl.
*B60C 11/12* (2006.01)
(52) U.S. Cl.
CPC ...... *B60C 11/1204* (2013.01); *B60C 11/1236* (2013.01); *B60C 11/1259* (2013.01); *B60C 11/1272* (2013.01)

(58) Field of Classification Search
CPC ............ B60C 11/1204; B60C 11/1236; B60C 11/1259; B60C 11/1272; B60C 11/13; B60C 11/12; B60C 11/03
See application file for complete search history.

(56) References Cited

U.S. PATENT DOCUMENTS

| 2013/0206298 A1 | 8/2013 | Guillermou et al. |
| 2015/0210121 A1 | 7/2015 | Sanae |

(Continued)

FOREIGN PATENT DOCUMENTS

| CN | 105172478 | 12/2015 |
| DE | 12 2010 0606 17 A1 | 5/2012 |

(Continued)

OTHER PUBLICATIONS

International Search Report for International Application No. PCT/JP2017/046133 dated Apr. 3, 2018, 4 pages, Japan.

*Primary Examiner* — Matthew J Daniels
*Assistant Examiner* — Shibin Liang
(74) *Attorney, Agent, or Firm* — Thorpe North & Western

(57) ABSTRACT

A pneumatic tire is provided. A rib includes a lug groove that opens at a first end portion to one of the main grooves and terminates at a second end portion within the rib, a first sipe that opens at a first end portion to the one of the main grooves the lug groove opens to and opens at a second end portion to the lug groove, and a second sipe that opens at a first end portion to another main groove located on the opposite side of the one of the main grooves the lug groove opens to and opens at a second end portion to the lug groove; and the first sipe and the second sipe each include a chamfered portion on the edge on the leading side or the edge on the trailing side.

19 Claims, 6 Drawing Sheets

(56) References Cited

U.S. PATENT DOCUMENTS

| | | |
|---|---|---|
| 2016/0023518 A1 | 1/2016 | Kawakami |
| 2017/0008346 A1* | 1/2017 | Kubo .................. B60C 11/0302 |
| 2017/0190222 A1* | 7/2017 | Suzuki ................ B60C 11/1236 |
| 2017/0253089 A1 | 9/2017 | Hayashi |
| 2018/0015788 A1 | 1/2018 | Hayashi |
| 2018/0065417 A1 | 3/2018 | Hoshiba |
| 2018/0162166 A1* | 6/2018 | Hiraishi .............. B60C 11/0327 |

FOREIGN PATENT DOCUMENTS

| | | | |
|---|---|---|---|
| DE | 11 2014 0040 35 T5 | 5/2019 | |
| DE | 11 2017 0044 38 T5 | 5/2019 | |
| EP | 0213452 | * 11/1987 | ............. B60C 11/12 |
| JP | 2013-537134 | 9/2013 | |
| JP | 2014-184736 | 10/2014 | |
| JP | 2015-140047 | 8/2015 | |
| JP | 2016-049879 | 4/2016 | |
| WO | WO 2012/032144 | 3/2012 | |
| WO | WO 2014/142349 | 9/2014 | |
| WO | 2016/024593 | * 2/2016 | |
| WO | WO 2016/024593 | 2/2016 | |
| WO | WO 2016/031158 | 3/2016 | |
| WO | WO 2016/125814 | 8/2016 | |
| WO | WO 2016/143642 | 9/2016 | |

* cited by examiner

PNEUMATIC TIRE

TECHNICAL FIELD

The present technology relates to a pneumatic tire and particularly relates to a pneumatic tire that can provide improved steering stability performance on dry road surfaces and improved steering stability performance on wet road surfaces in a compatible manner by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates.

Various pneumatic tires have been proposed in which sipes are formed in a tread pattern and chamfered (for example, see Japan Unexamined Patent Publication No. 2013-537134). In a case where the sipes are formed and chamfered, edge effects may be lost depending on the shape of the chamfers, and depending on the dimensions of the chamfers, improvement of steering stability performance on dry road surfaces or improvement of steering stability performance on wet road surfaces may be insufficient.

SUMMARY

The present technology provides a pneumatic tire that can provide improved steering stability performance on dry road surfaces and improved steering stability performance on wet road surfaces in a compatible manner by devising a sipe chamfer shape.

A pneumatic tire according to an embodiment of the present technology includes:

in a tread portion, main grooves extending in a tire circumferential direction; and a rib defined by the main grooves;

the rib including a lug groove that opens at a first end portion to one of the main grooves and terminates at a second end portion within the rib, a first sipe that opens at a first end portion to the one of the main grooves the lug groove opens to and opens at a second end portion to the lug groove, and a second sipe that opens at a first end portion to another main groove located on an opposite side of the one of the main grooves the lug groove opens to and opens at a second end portion to the lug groove; and the first sipe and the second sipe each including a chamfered portion on an edge on a leading side or an edge on a trailing side.

In an embodiment of the present technology, in the pneumatic tire that includes, in the tread portion, main grooves extending in the tire circumferential direction and the rib defined by the main grooves including sipes extending in a tire lateral direction, the rib includes the lug groove that opens at a first end portion to one of the main grooves and terminates at a second end portion within the rib, the first sipe that opens at a first end portion to the one of the main grooves the lug groove opens to and opens at a second end portion to the lug groove, and the second sipe that opens at a first end portion to another main groove located on the opposite side of the one of the main grooves the lug groove opens to and opens at a second end portion to the lug groove; and the first sipe and the second sipe each include a chamfered portion on the edge on the leading side or the edge on the trailing side. Accordingly, at a portion opposite the chamfered portions of the first sipe and the second sipe, other chamfered portions are not present. This allows the drainage effect from the chamfered portions to be enhanced and for a water film to be effectively removed via an edge effect in the regions without other chamfered portions (non-chamfered regions). As a result, the steering stability performance on wet road surfaces can be greatly improved. Additionally, compared to a known chamfered sipe, the chamfered area can be minimized, so the steering stability performance on dry road surfaces can be improved. Additionally, because the first end portions of both the first sipe and the second sipe open to the lug groove, the first sipe and the second sipe are connected via the lug groove, and substantially, the sipes have a structure that extends through the rib. Thus, drainage properties are improved, and steering stability performance on wet road surfaces can be enhanced.

In an embodiment of the present technology, preferably a maximum depth x (mm) of the first sipe and the second sipe and a maximum depth y (mm) of the chamfered portion satisfy a relationship of Formula (1); and a sipe width of the sipes is constant in a range from an end portion located on an inner side in a tire radial direction of the chamfered portion of the first sipe and the second sipe to a groove bottom of the sipes. In this way, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner.

$$x \times 0.1 \leq y \leq x \times 0.3 + 1.0 \tag{1}$$

In an embodiment of the present technology, preferably the first sipe and the second sipe are disposed at intervals in the tire circumferential direction. In this way, the pattern rigidity can be ensured, and the steering stability performance on dry road surfaces can be improved.

In an embodiment of the present technology, preferably a sipe interval d (mm) between the first sipe and the second sipe in the tire circumferential direction, a tire outer diameter OD, and a rib width W of the rib satisfy a relationship of Formula (2). In this way, the pattern rigidity can be ensured, and the steering stability performance on dry road surfaces can be improved.

$$(1/OD + \tfrac{1}{2}W) \times 300 \leq d \leq (1/OD + \tfrac{1}{2}W) \times 3000 \tag{2}$$

In an embodiment of the present technology, preferably the lug groove includes a raised bottom portion. In this way, the pattern rigidity increases, and the steering stability performance on dry road surfaces can be improved.

In an embodiment of the present technology, preferably a projected area of the raised bottom portion of the lug groove is from 30% to 70% of a projected area of the lug groove. In this way, the steering stability performance on dry road surfaces and the steering stability performance on wet road surfaces can be enhanced in a well-balanced manner. More preferably, the range is from 40% to 60%.

In an embodiment of the present technology, preferably at least one of the first sipe or the second sipe opens to the raised bottom portion of the lug groove. This allows a significant decrease in rigidity to be prevented.

In an embodiment of the present technology, preferably the lug groove includes a bent portion. In this way, the pattern rigidity increases, and the steering stability performance on dry road surfaces can be improved.

In an embodiment of the present technology, preferably a third sipe not including a chamfered portion is disposed on an extension line of each of the first sipe and the second sipe. In this way, drainage properties can be improved and the steering stability performance on wet road surfaces can be enhanced.

In an embodiment of the present technology, preferably the chamfered portion of the first sipe and the chamfered portion of the second sipe in the same rib are both disposed on the edge on the trailing side or both disposed on the edge on the leading side. In this way, a local decrease in rigidity can be prevented, which allows the steering stability performance on dry road surfaces to be improved.

In an embodiment of the present technology, preferably a maximum width of the chamfered portion of the first sipe and the second sipe is from 0.8 times to 5.0 times a sipe width of the first sipe and the second sipe. In this way, the steering stability performance on dry road surfaces and the steering stability performance on wet road surfaces can be improved in a compatible manner. More preferably, the range is from 1.2 times to 3.0 times.

In an embodiment of the present technology, preferably a lug groove length of the lug groove is from 0.5 times to 0.9 times a rib width W of the rib. In this way, the steering stability performance on dry road surfaces and the steering stability performance on wet road surfaces can be improved in a compatible manner. More preferably, the range is from 0.6 times to 0.8 times.

In an embodiment of the present technology, preferably a maximum width of the lug groove is from 2 mm to 7 mm. In this way, the steering stability performance on wet road surfaces can be improved. More preferably, the range is from 3 mm to 6 mm.

In an embodiment of the present technology, preferably a maximum depth of the lug groove is from 3 mm to 8 mm. In this way, the steering stability performance on wet road surfaces can be improved. More preferably, the range is from 4 mm to 7 mm.

DETAILED DESCRIPTION

Figure 1:
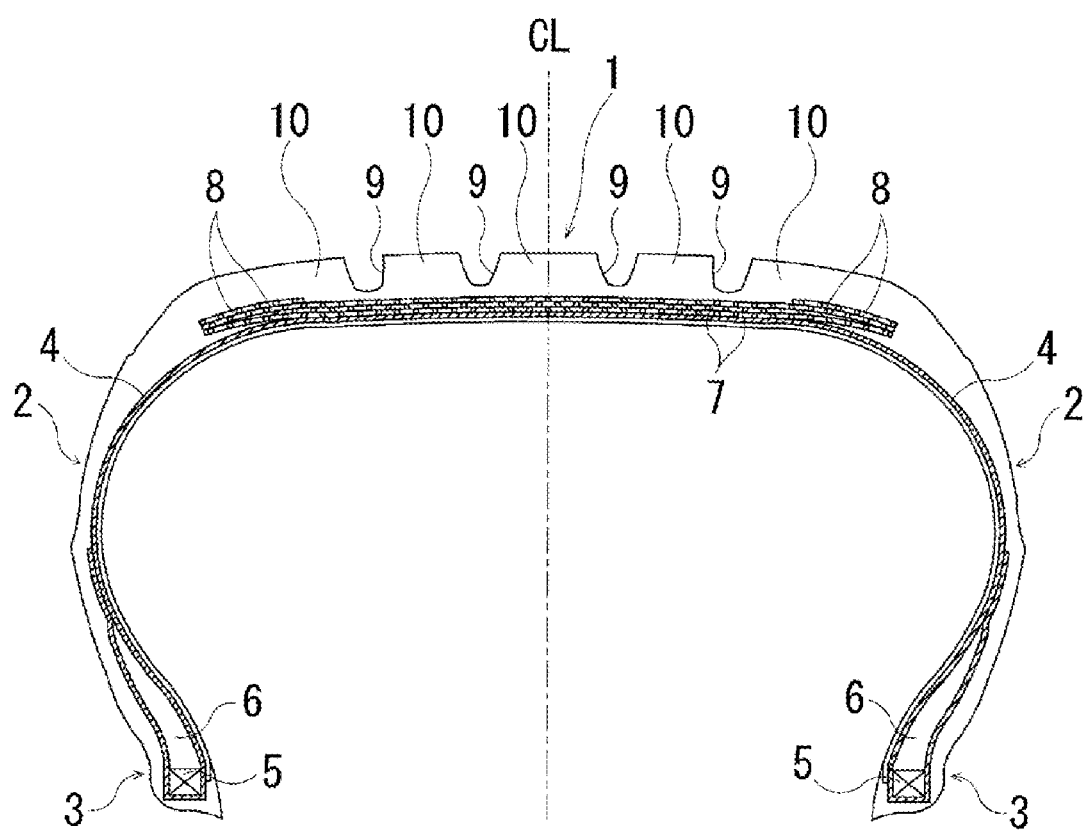
FIG. 1 is a meridian cross-sectional view illustrating a pneumatic tire according to an embodiment of the present technology.

Configurations of embodiments of the present technology are described in detail below with reference to the accompanying drawings. In FIG. 1, CL denotes the tire center line.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction are formed in the tread portion 1. These main grooves 9 define a plurality of ribs 10 in the tread portion 1. Note that in the present technology, the main groove 9 refers to a groove including a wear indicator.

Note that the tire internal structure described above represents a typical example for a pneumatic tire, and the pneumatic tire is not limited thereto.

Figure 2:
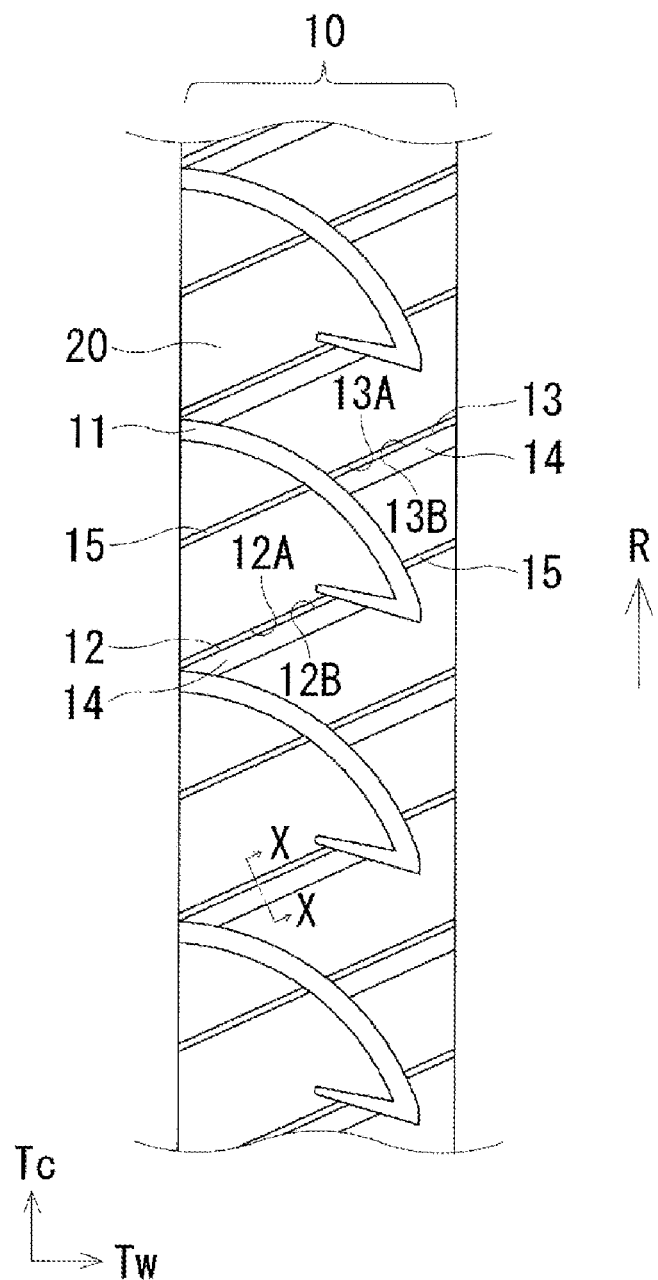
FIG. 2 is a plan view illustrating a portion of a tread portion of a pneumatic tire according to an embodiment of the present technology.
Figure 3:
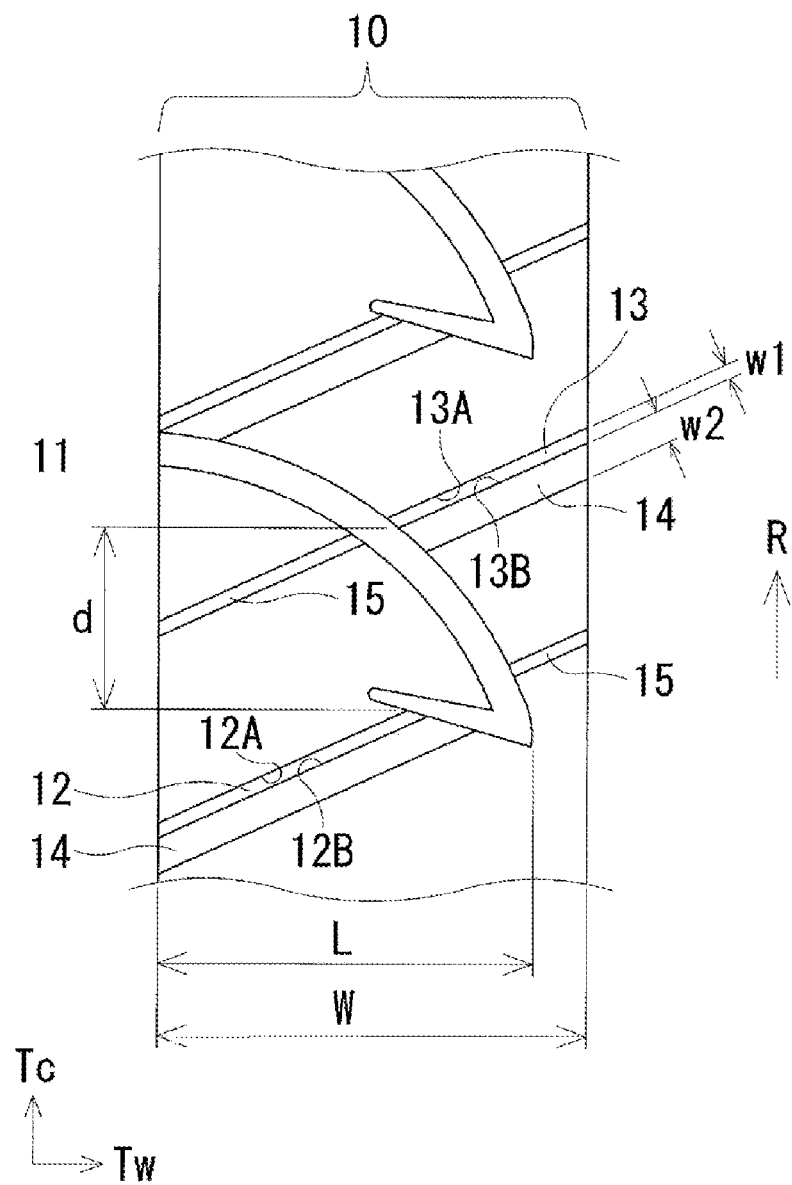
FIG. 3 is a plan view illustrating a portion of a rib formed in a tread portion of a pneumatic tire according to an embodiment of the present technology.
Figure 4:
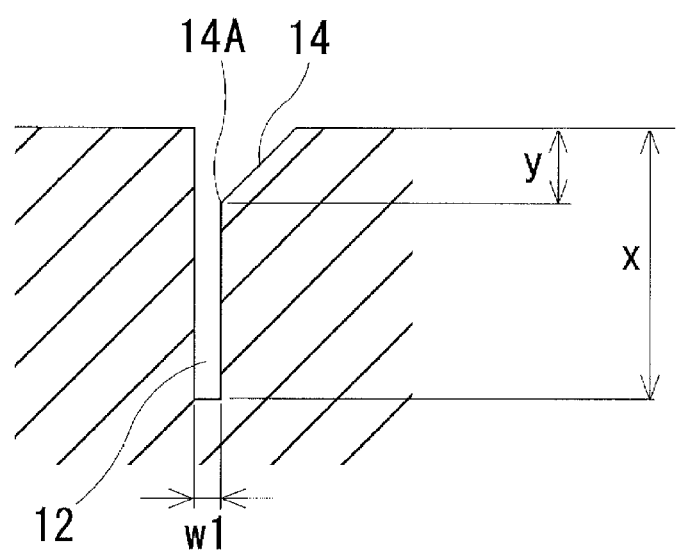
FIG. 4 is a cross-sectional view taken along line X-X in the direction of the arrow in FIG. 2.

FIGS. 2 to 4 are cross-sectional views illustrating a portion of the tread portion of the pneumatic tire according to an embodiment of the present technology. In FIGS. 2 and 3, Tc indicates the tire circumferential direction and Tw indicates the tire lateral direction. As illustrated in FIG. 2, the rib 10 includes a plurality of lug grooves 11 extending in the tire lateral direction, a plurality of first sipes 12, second sipes 13, and third sipes 15 extending in the tire lateral direction, and a plurality of blocks 20 defined by the lug grooves 11, the first sipes 12, the second sipes 13, and the third sipes 15. The first sipe 12, the second sipe 13, and the third sipe 15 are narrow grooves having a groove width of 1.5 mm or less.

The lug grooves 11 are inclined with respect to the tire lateral direction and are formed at intervals in the tire circumferential direction within the rib 10. A first end portion of the lug groove 11 opens to one of the main grooves 9, and a second end portion terminates within the rib 10. In order to the improve the steering stability performance on wet road surfaces, the lug grooves 11 preferably have a maximum width from 2 mm to 7 mm and more preferably from 3 mm to 6 mm, and preferably have a maximum depth of 3 mm to 8 mm and more preferably from 4 mm to 7 mm.

The first sipes 12 and the second sipes 13 are inclined in the same direction with respect to the tire lateral direction and are formed at intervals in the tire circumferential direction within the rib 10. A first end portion of the first sipe 12 opens to the one of the main grooves 9 the lug groove 11 opens to, and a second end portion opens to the lug groove 11. A first end portion of the second sipe 13 opens to another main groove 9 located on the opposite side of the one of the main grooves 9 the lug groove 11 opens to, and a second end portion opens to the lug groove 11. A first end portion of the third sipe 15 opens to the main groove 9, and a second end portion opens to the lug groove 11. That is, the first sipe 12, the second sipe 13, and the third sipe 15 are all open sipes.

Figure 5:
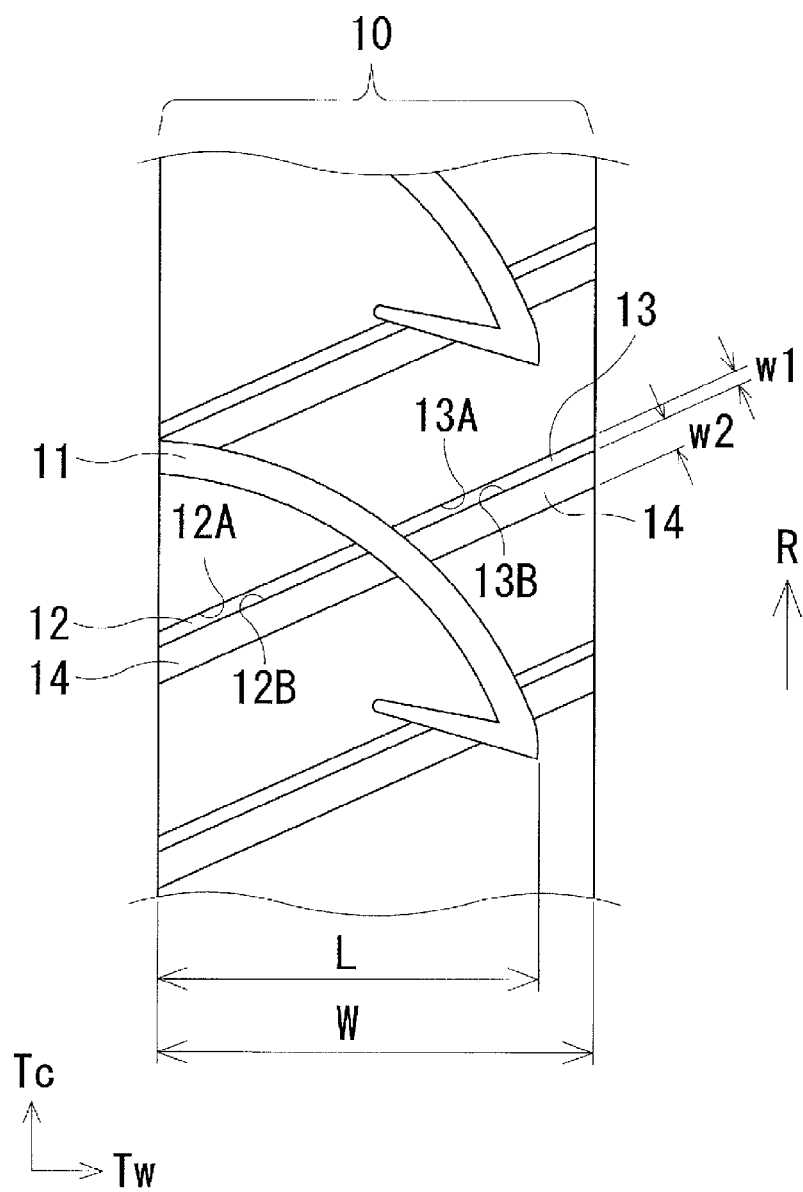
FIG. 5 is a plan view illustrating a modified example of a rib formed in a tread portion of a pneumatic tire according to an embodiment of the present technology.

In FIG. 2, the first sipes 12 and the second sipes 13, which communicate with the main grooves 9, 9 located on both sides of the rib 10, are alternately disposed in the tire circumferential direction, and overall, the first sipes 12 and the second sipes 13 are disposed in a staggered manner in the tire circumferential direction. However, as illustrated in FIG. 5, a configuration may be adopted in which the first sipes 12 and the second sipes 13 are disposed on an extension line of each other.

The first sipes 12 and the second sipes 13 each includes edges 12A, 13A on the leading side with respect to a rotation direction R and edges 12B, 13B on the trailing side with respect to the rotation direction R. A chamfered portion 14 is formed on one of the edges 12A, 13A on the leading side or the edges 12B, 13B on the trailing side. In FIG. 2, the chamfered portion 14 is formed on the edge 12B on the trailing side of the first sipe 12 and the edge 13B on the trailing side of the second sipe 13. At a portion opposite the chamfered portion 14 of the first sipe 12 and the chamfered portion 14 of the second sipe 13, non-chamfered regions in which other chamfered portions are not present are provided. The third sipe 15 does not include a chamfered portion.

FIG. 4 is a view orthogonal to the extension direction of the first sipe, with the tread portion cut away in the vertical direction. As illustrated in FIG. 4, the maximum depth of the first sipe 12 is x (mm) and the maximum depth of the chamfered portion 14 is y (mm), and the first sipe 12 and the chamfered portion 14 are formed so that the maximum depth y (mm) is less than the maximum depth x (mm). The maximum depth x of the first sipe 12 is preferably from 3 mm to 8 mm. A sipe width w1 of the first sipe 12 is substantially constant in a range from an end portion 14A located on the inner side of the chamfered portion 14 in the tire radial direction to the groove bottom of the first sipe 12. In a configuration in which a protrusion is disposed on the groove wall of the first sipe 12, for example, the sipe width w1 does not include the height of the protrusion. Also, in a configuration in which the sipe width w1 of the first sipe 12 gradually narrows toward the groove bottom, the width of the first sipe 12 is substantially measured as the sipe width w1 not including the narrow portion. The second sipe 13 also has a structure similar to the above-described structure of the first sipe 12 in the depth direction.

In the pneumatic tire described above, the rib 10 includes the lug groove 11 that opens at a first end portion to one of the main grooves 9 and terminates at a second end portion within the rib 10, the first sipe 12 that opens at a first end portion to the one of the main grooves 9 the lug groove 11 opens to and opens at a second end portion to the lug groove 11, and the second sipe 13 that opens at a first end portion to another main groove 9 located on the opposite side of the one of the main grooves 9 the lug groove 11 opens to and opens at a second end portion to the lug groove 11; and the first sipe 12 and the second sipe 13 each include the chamfered portion 14 on the edge 12A, 13A on the leading side or the edge 12B, 13B on the trailing side. Accordingly, at a portion opposite the chamfered portions 14 of the first sipe 12 and the second sipe 13, other chamfered portions are not present. This allows the drainage effect from the chamfered portions 14 to be enhanced and for a water film to be effectively removed via an edge effect in the regions without other chamfered portions (non-chamfered regions). As a result, the steering stability performance on wet road surfaces can be greatly improved. Additionally, compared to a known chamfered sipe, the chamfered area can be minimized, so the steering stability performance on dry road surfaces can be improved. Additionally, because the first end portions of both the first sipe 12 and the second sipe 13 open to the lug groove 11, the first sipe 12 and the second sipe 13 are connected via the lug groove 11, and substantially, the sipes have a structure that extends through the rib 10. Thus, drainage properties are improved, and steering stability performance on wet road surfaces can be enhanced.

In the pneumatic tire described above, as illustrated in FIG. 2, the first sipes 12 and the second sipes 13 are preferably disposed at intervals in the tire circumferential direction. In such a case, the configuration illustrated in FIG. 5 in which the first sipes 12 and the second sipes 13 are disposed on an extension line of each other is not included. By disposing the first sipes 12 and the second sipe 13 in this way, the pattern rigidity can be ensured, and the steering stability performance on dry road surfaces can be improved.

Additionally, the third sipe 15 that does not include a chamfered portion is preferably disposed in the rib 10 on an extension line of each of the first sipe 12 and the second sipe 13. By forming the third sipe 15 in the rib 10 in this manner, drainage properties can be improved and the steering stability performance on wet road surfaces can be enhanced.

Furthermore, the chamfered portion 14 of the first sipe 12 and the chamfered portion 14 of the second sipe 13 in the same rib 10 are preferably disposed on the edge on the same side, the trailing side or the leading side. By providing the chamfered portion 14 in this manner, a local decrease in rigidity can be prevented, which allows the steering stability performance on dry road surfaces to be improved.

In the pneumatic tire described above, the maximum depth x (mm) and the maximum depth y (mm) preferably satisfy the relationship of Formula (1) below. By providing the first sipe 12, the second sipe 13, and the chamfered portions 14 so as to satisfy the relationship of Formula (1) below, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Here, when y<x×0.1 is true, the drainage effect from the chamfered portions 14 is insufficient, and when y>x×0.3+1.0 is true, the rigidity of the rib 10 is reduced, leading to a reduction in the steering stability performance on dry road surfaces. In particular, the relationship y≤x×0.3+0.5 is preferably satisfied.

$$x \times 0.1 \leq y \leq x \times 0.3 + 1.0 \tag{1}$$

Also, as illustrated in FIG. 3, in the first sipe 12 and the second sipe 13, the distance in the tire circumferential direction where the end portions of the sipes located on the center side of the rib 10 are closest to each other is defined as a sipe interval d (mm), and a width of the rib 10 is defined as a rib width W (mm). Here, the sipe interval d, a tire outer diameter OD, and the rib width W of the rib 10 preferably satisfy the relationship of Formula (2) below. By providing the first sipes 12 and the second sipe 13 in this way so as to satisfy the relationship of Formula (2) below, the pattern rigidity can be ensured, and the steering stability performance on dry road surfaces can be improved. Note that the tire outer diameter OD (mm) is measured at the position of the tire center line CL.

$$(1/OD + \tfrac{1}{2}W) \times 300 \leq d \leq (1/OD + \tfrac{1}{2}W) \times 3000 \tag{2}$$

The width of the first sipe 12 or the second sipe 13 measured in a direction orthogonal to the first sipe 12 or the second sipe 13 is defined as the sipe width w1, and the maximum width of the chamfered portion 14 is a maximum width w2. The maximum width w2 of the chamfered portions 14 of the first sipe 12 and the second sipe 13 is preferably from 0.8 times to 5.0 times the sipe width w1 of the first sipe 12 and the second sipe 13, and more preferably from 1.2 times to 3.0 times. By the maximum width w2 of the chamfered portion 14 being appropriately set with respect to the sipe width w1 in this manner, the steering stability performance on dry road surfaces and the steering stability performance on wet road surfaces can be improved in a compatible manner. When the maximum width w2 of the chamfered portion 14 is less than 0.8 times the sipe width w1, the effect of enhancing the steering stability performance on wet road surfaces cannot be sufficiently obtained, and when the maximum width w2 is greater than 5.0 times the sipe width w1, the effect of enhancing the steering stability performance on dry road surfaces cannot be sufficiently obtained.

The length of the lug grooves 11 in the tire lateral direction is referred to as a lug groove length L. The lug groove length L of the lug grooves 11 is preferably from 0.5 times to 0.9 times the rib width W of the rib 10, and more preferably from 0.6 times to 0.8 times. By the lug groove length L being appropriately set with respect to the rib width W in this manner, the steering stability performance on dry road surfaces and the steering stability performance on wet road surfaces can be improved in a compatible manner. When the lug groove length L of the lug grooves 11 is less than 0.5 times the rib width W of the rib 10, the effect of enhancing the steering stability performance on wet road surfaces cannot be sufficiently obtained, and when the lug groove length L is greater than 0.9 times the rib width W, the effect of enhancing the steering stability performance on dry road surfaces cannot be sufficiently obtained.

Figure 6:
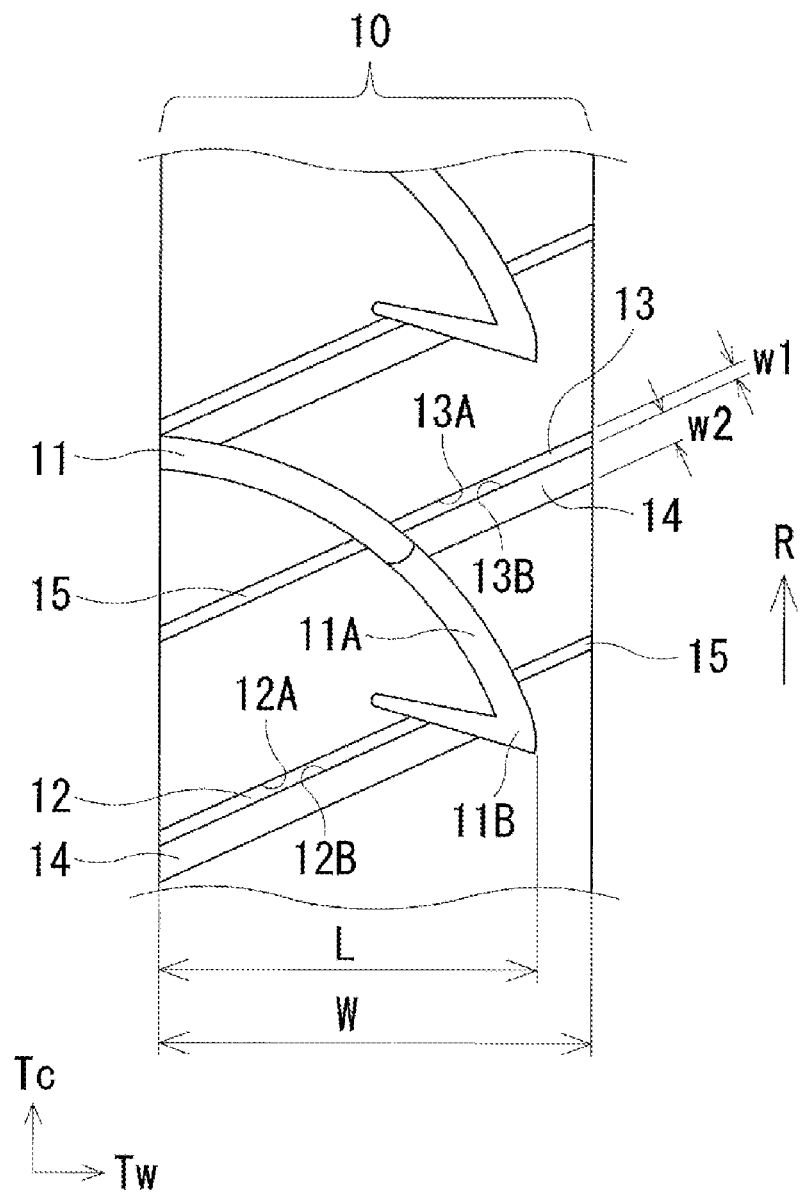
FIG. 6 is a plan view illustrating another modified example of a rib formed in a tread portion of a pneumatic tire according to an embodiment of the present technology.

FIG. 6 is a diagram illustrating another modified example of a rib formed in the tread portion of a pneumatic tire according to an embodiment of the present technology. A raised bottom portion 11A is formed in the lug groove 11 at a portion from the center portion region of the rib 10 to the terminating end portion of the lug groove 11. By the lug groove 11 including the raised bottom portion 11A in this manner, the pattern rigidity increases, and the steering stability performance on dry road surfaces can be improved. In addition, a bent portion 11B that is bent toward the opening end of the lug groove 11 is formed in the lug groove 11. By the lug groove 11 including the bent portion 11B in this manner, the pattern rigidity increases, and the steering stability performance on dry road surfaces can be improved.

In particular, a projected area A2 of the raised bottom portion 11A of the lug groove 11 is preferably from 30% to 70% of a projected area A1 of the lug groove 11, and more preferably from 40% to 60%. By the projected area A2 of the raised bottom portion 11A of the lug groove 11 being appropriately set with respect to the projected area A1 of the lug groove 11 in this manner, the steering stability performance on dry road surfaces and the steering stability performance on wet road surfaces can be enhanced in a well-balanced manner. Note that the projected area A1 of the lug groove 11 and the projected area A2 of the raised bottom portion 11A of the lug groove 11 are areas measured when the lug groove 11 and the raised bottom portion 11A of the lug groove 11 are projected in a normal line direction with respect to the road contact surface of the tread portion 1.

In the embodiment illustrated in FIG. 6, the first sipe 12 opens to the raised bottom portion 11A of the lug groove 11. However, a structure in which both the first sipe 12 and the second sipe 13 open to the raised bottom portion 11A of the lug groove 11 may also be adopted. In other words, in the present embodiment, it is only required that at least one of the first sipe 12 or the second sipe 13 opens to the raised bottom portion 11A of the lug groove 11. This allows a significant decrease in rigidity to be prevented, which allows the steering stability performance on dry road surfaces to be improved.

EXAMPLES

Pneumatic tires according to Conventional Examples 1 and 2 and Examples 1 to 14 were manufactured. The tires have a tire size of 245/40R19 and include, in a tread portion, main grooves that extend in the tire circumferential direction and ribs defined by the main grooves. The tires are set as indicated in Tables 1 and 2 for the following: lug groove extends through rib, sipe including chamfered portion opens to main groove and lug groove, sipe width w1, tire outer diameter OD (mm), rib width W (mm), sipe interval d (mm), lug groove provided with raised bottom portion, ratio of projected area A2 of raised bottom portion of lug groove to projected area A1 of lug groove (A2/A1×100%), first sipe and second sipe open to raised bottom portion of lug groove, lug groove provided with bent portion, third sipe located on extension line of first sipe or second sipe, position of chamfered portion of first sipe and second sipe (same or opposite side), ratio of maximum width w2 of chamfered portion to sipe width w1 (w2/w1), ratio of lug groove length L to rib width W (L/W), maximum width of lug groove (mm), and maximum depth of lug groove (mm).

Note that in Conventional Example 1, only lug grooves that extend through the ribs are formed in the rib, and in Conventional Example 2, the rib includes lug grooves that extend through the rib and sipes including a chamfered portion, with the sipes opening at both end portions to the main grooves.

These test tires underwent a sensory evaluation by a test driver for steering stability performance on dry road surfaces and steering stability performance on wet road surface. The results thereof are shown in Tables 1 and 2.

Sensory evaluation for steering stability performance on dry road surfaces and steering stability performance on wet road surfaces was performed with the test tires on a wheel with a rim size of 19×8.5J mounted on a vehicle and inflated to an air pressure of 260 kPa. Evaluation results are expressed as index values, with the results of Conventional Example 1 being assigned an index value of 100. Larger index values indicate superior steering stability performance on dry road surfaces and steering stability performance on wet road surfaces.

TABLE 1

|  | Conventional Example 1 | Conventional Example 2 | Example 1 | Example 2 |
|---|---|---|---|---|
| Lug groove extends through rib | Yes | Yes | No | No |
| Sipe including chamfered portion opens to main groove and lug groove | — | No | Yes | Yes |

TABLE 1-continued

| | | | | |
|---|---|---|---|---|
| Sipe width w1 | Constant | Changes | Changes | Constant |
| Tire outer diameter OD (mm) | 678 | 678 | 678 | 678 |
| Rib width W (mm) | 30 | 30 | 30 | 30 |
| Sipe interval d (mm) | — | — | 0 | 0 |
| Lug groove provided with raised bottom portion | No | No | No | No |
| Ratio of projected area A2 of raised bottom portion of lug groove to projected area A1 of lug groove (A2/A1 × 100%) | — | — | — | — |
| First sipe and second sipe open to raised bottom portion of lug groove | — | — | — | — |
| Lug groove provided with bent portion | No | No | No | No |
| Third sipe located on extension line of first sipe or second sipe | — | — | No | No |
| Position of chamfered portion of first sipe and second sipe (same or opposite side) | — | — | Opposite side | Opposite side |
| Ratio of maximum width w2 of chamfered portion to sipe width w1 (w2/w1) | — | 0.7 | 0.7 | 0.7 |
| Ratio of lug groove length L to rib width W (L/W) | 0.5 | 0.5 | 0.5 | 0.5 |
| Maximum width of lug groove (mm) | 1.8 | 1.8 | 1.8 | 1.8 |
| Maximum depth of lug groove (mm) | 2.0 | 2.0 | 2.0 | 2.0 |
| Steering stability performance on dry road surfaces | 100 | 90 | 103 | 104 |
| Steering stability performance on wet road surface | 100 | 105 | 103 | 104 |

| | Example 3 | Example 4 | Example 5 | Example 6 |
|---|---|---|---|---|
| Lug groove extends through rib | No | No | No | No |
| Sipe including chamfered portion opens to main groove and lug groove | Yes | Yes | Yes | Yes |
| Sipe width w1 | Constant | Constant | Constant | Constant |
| Tire outer diameter OD (mm) | 678 | 678 | 678 | 678 |
| Rib width W (mm) | 30 | 30 | 30 | 30 |
| Sipe interval d (mm) | 8 | 8 | 8 | 8 |
| Lug groove provided with raised bottom portion | No | No | Yes | Yes |
| Ratio of projected area A2 of raised bottom portion of lug groove to projected area A1 of lug groove (A2/A1 × 100%) | — | — | 20% | 50% |
| First sipe and second sipe open to raised bottom portion of lug groove | — | — | No | No |
| Lug groove provided with bent portion | No | No | No | No |
| Third sipe located on extension line of first sipe or second sipe | No | No | No | No |
| Position of chamfered portion of first sipe and second sipe (same or opposite side) | Opposite side | Opposite side | Opposite side | Opposite side |
| Ratio of maximum width w2 of chamfered portion to sipe width w1 (w2/w1) | 0.7 | 0.7 | 0.7 | 0.7 |
| Ratio of lug groove length L to rib width W (L/W) | 0.5 | 0.5 | 0.5 | 0.5 |
| Maximum width of lug groove (mm) | 1.8 | 1.8 | 1.8 | 1.8 |
| Maximum depth of lug groove (mm) | 2.0 | 2.0 | 2.0 | 2.0 |
| Steering stability performance on dry road surfaces | 105 | 106 | 107 | 108 |
| Steering stability performance on wet road surface | 104 | 104 | 103 | 103 |

TABLE 2

|  | Example 7 | Example 8 | Example 9 | Example 10 |
|---|---|---|---|---|
| Lug groove extends through rib | No | No | No | No |
| Sipe including chamfered portion opens to main groove and lug groove | Yes | Yes | Yes | Yes |
| Sipe width w1 | Constant | Constant | Constant | Constant |
| Tire outer diameter OD (mm) | 678 | 678 | 678 | 678 |
| Rib width W (mm) | 30 | 30 | 30 | 30 |
| Sipe interval d (mm) | 8 | 8 | 8 | 8 |
| Lug groove provided with raised bottom portion | Yes | Yes | Yes | Yes |
| Ratio of projected area A2 of raised bottom portion of lug groove to projected area A1 of lug groove (A2/A1 × 100%) | 50% | 50% | 50% | 50% |
| First sipe and second sipe open to raised bottom portion of lug groove | Yes | Yes | Yes | Yes |
| Lug groove provided with bent portion | No | Yes | Yes | Yes |
| Third sipe located on extension line of first sipe or second sipe | No | No | Yes | Yes |
| Position of chamfered portion of first sipe and second sipe (same or opposite side) | Opposite side | Opposite side | Opposite side | Same side |
| Ratio of maximum width w2 of chamfered portion to sipe width w1 (w2/w1) | 0.7 | 0.7 | 0.7 | 0.7 |
| Ratio of lug groove length L to rib width W (L/W) | 0.5 | 0.5 | 0.5 | 0.5 |
| Maximum width of lug groove (mm) | 1.8 | 1.8 | 1.8 | 1.8 |
| Maximum depth of lug groove (mm) | 2.0 | 2.0 | 2.0 | 2.0 |
| Steering stability performance on dry road surfaces | 108 | 109 | 108 | 109 |
| Steering stability performance on wet road surface | 105 | 106 | 108 | 108 |

|  | Example 11 | Example 12 | Example 13 | Example 14 |
|---|---|---|---|---|
| Lug groove extends through rib | No | No | No | No |
| Sipe including chamfered portion opens to main groove and lug groove | Yes | Yes | Yes | Yes |
| Sipe width w1 | Constant | Constant | Constant | Constant |
| Tire outer diameter OD (mm) | 678 | 678 | 678 | 678 |
| Rib width W (mm) | 30 | 30 | 30 | 30 |
| Sipe interval d (mm) | 8 | 8 | 8 | 8 |
| Lug groove provided with raised bottom portion | Yes | Yes | Yes | Yes |
| Ratio of projected area A2 of raised bottom portion of lug groove to projected area A1 of lug groove (A2/A1 × 100%) | 50% | 50% | 50% | 50% |
| First sipe and second sipe open to raised bottom portion of lug groove | Yes | Yes | Yes | Yes |
| Lug groove provided with bent portion | Yes | Yes | Yes | Yes |
| Third sipe located on extension line of first sipe or second sipe | Yes | Yes | Yes | Yes |
| Position of chamfered portion of first sipe and second sipe (same or opposite side) | Same side | Same side | Same side | Same side |
| Ratio of maximum width w2 of chamfered portion to sipe width w1 (w2/w1) | 2.0 | 2.0 | 2.0 | 2.0 |
| Ratio of lug groove length L to rib width W (L/W) | 0.5 | 0.75 | 0.75 | 0.75 |
| Maximum width of lug groove (mm) | 1.8 | 1.8 | 4.0 | 4.0 |
| Maximum depth of lug groove (mm) | 2.0 | 2.0 | 2.0 | 6.0 |
| Steering stability performance on dry road surfaces | 108 | 108 | 107 | 107 |
| Steering stability performance on wet road surface | 110 | 113 | 114 | 115 |

As can be seen from Tables 1 and 2, by devising the shape of the chamfered portions formed on the sipes, the tire of Examples 1 to 14 had both enhanced steering stability performance on dry road surfaces and steering stability performance on wet road surfaces.

The invention claimed is:

1. A pneumatic tire, comprising:
   in a tread portion, main grooves extending in a tire circumferential direction; and
   a rib defined by the main grooves;
   the rib comprising
   a lug groove that opens at a first end portion to one of the main grooves and terminates at a second end portion within the rib,
   a first sipe that opens at a first end portion to the one of the main grooves the lug groove opens to and opens at a second end portion to the lug groove, and
   a second sipe that opens at a first end portion to another main groove located on an opposite side of the one of the main grooves the lug groove opens to and opens at a second end portion to the lug groove;
   the first sipe and the second sipe each comprising a chamfered portion on only one of an edge on a leading side or an edge on a trailing side;
   a third sipe not comprising a chamfered portion disposed on an extension line of each of the first sipe and the second sipe, the third sipe being discontinuous from each of the first sipe and the second sipe and being arranged alternatingly in the tire circumferential direction with each of the first sipe and the second sipe.

2. The pneumatic tire according to claim 1, wherein
   a maximum depth x (mm) of the first sipe and the second sipe and a maximum depth y (mm) of the chamfered portion satisfy a relationship of Formula (1); and
   a sipe width of the sipes is constant in a range from an end portion located on an inner side in a tire radial direction of the chamfered portion of the first sipe and the second sipe to a groove bottom of the sipes;

$$x \times 0.1 \leq y \leq x \times 0.3 + 1.0 \qquad (1).$$

3. The pneumatic tire according to claim 2, wherein the first sipe and the second sipe are disposed at intervals in the tire circumferential direction.

4. The pneumatic tire according to claim 3, wherein a sipe interval d (mm) between the first sipe and the second sipe in the tire circumferential direction, a tire outer diameter OD, and a rib width W of the rib satisfy a relationship of Formula (2);

$$(1/OD + \tfrac{1}{2}W) \times 300 \leq d \leq (1/OD + \tfrac{1}{2}W) \times 3000 \qquad (2).$$

5. The pneumatic tire according to claim 4, wherein the lug groove comprises a raised bottom portion.

6. The pneumatic tire according to claim 5, wherein a projected area of the raised bottom portion of the lug groove is from 30% to 70% of a projected area of the lug groove.

7. The pneumatic tire according to claim 6, wherein at least one of the first sipe or the second sipe opens to the raised bottom portion of the lug groove.

8. The pneumatic tire according to 7, wherein the lug groove comprises a bent portion.

9. The pneumatic tire according to claim 1, wherein the first sipe and the second sipe are disposed at intervals in the tire circumferential direction.

10. The pneumatic tire according to claim 1, wherein a sipe interval d (mm) between the first sipe and the second sipe in the tire circumferential direction, a tire outer diameter OD, and a rib width W of the rib satisfy a relationship of Formula (2);

$$(1/OD + \tfrac{1}{2}W) \times 300 \leq d \leq (1/OD + \tfrac{1}{2}W) \times 3000 \qquad (2).$$

11. The pneumatic tire according to claim 1, wherein the lug groove comprises a raised bottom portion.

12. The pneumatic tire according to claim 11, wherein a projected area of the raised bottom portion of the lug groove is from 30% to 70% of a projected area of the lug groove.

13. The pneumatic tire according to claim 11, wherein at least one of the first sipe or the second sipe opens to the raised bottom portion of the lug groove.

14. The pneumatic tire according to claim 1, wherein the lug groove comprises a bent portion.

15. The pneumatic tire according to claim 1, wherein the chamfered portion of the first sipe and the chamfered portion of the second sipe in the same rib are both disposed on the edge on the trailing side or both disposed on the edge on the leading side.

16. The pneumatic tire according to claim 1, wherein a maximum width of the chamfered portion of the first sipe and the second sipe is from 0.8 times to 5.0 times a sipe width of the first sipe and the second sipe.

17. The pneumatic tire according to claim 1, wherein a lug groove length of the lug groove is from 0.5 times to 0.9 times a rib width W of the rib.

18. The pneumatic tire according to claim 1, wherein a maximum width of the lug groove is from 2 mm to 7 mm.

19. The pneumatic tire according to claim 1, wherein a maximum depth of the lug groove is from 3 mm to 8 mm.

* * * * *